(12) United States Patent
Cabanaw et al.

(10) Patent No.: US 7,564,005 B2
(45) Date of Patent: *Jul. 21, 2009

(54) RESISTANCE WELDING FASTENER ELECTRODE AND MONITOR AND METHOD OF USING SAME

(75) Inventors: Daniel Martin Cabanaw, Essex (CA); David M. Beneteau, Amherstburg (CA)

(73) Assignee: Doben Limited, Windsor (CA)

( * ) Notice: Subject to any disclaimer, the term of this patent is extended or adjusted under 35 U.S.C. 154(b) by 563 days.

This patent is subject to a terminal disclaimer.

(21) Appl. No.: 11/001,505

(22) Filed: Dec. 1, 2004

(65) Prior Publication Data

US 2005/0150874 A1    Jul. 14, 2005

Related U.S. Application Data

(63) Continuation-in-part of application No. 10/360,237, filed on Feb. 6, 2003, now Pat. No. 6,906,279.

(60) Provisional application No. 60/538,054, filed on Jan. 21, 2004.

(51) Int. Cl.
    *B23K 11/25* (2006.01)
(52) U.S. Cl. ................................ 219/117.1; 219/109
(58) Field of Classification Search .............. 219/119, 219/117.1, 93, 109
    See application file for complete search history.

(56) References Cited

U.S. PATENT DOCUMENTS

| 2,370,009 A | 2/1945 | Clark et al. |
| 2,851,583 A | 9/1958 | Sciaky |
| 3,400,242 A | 9/1968 | Waller |
| 3,417,221 A | 12/1968 | Hayward |
| 3,585,347 A | 6/1971 | Needham |
| 3,609,285 A | 9/1971 | Scarpelli |
| 3,657,509 A | 4/1972 | Beneteau ............. 219/120 |
| 3,708,648 A | 1/1973 | Croucher et al. |
| 4,028,522 A | 6/1977 | Chihoski et al. |
| 4,296,304 A | 10/1981 | Defourny |
| 4,296,679 A | 10/1981 | Mattsson |
| 4,419,558 A | 12/1983 | Stiebel |

(Continued)

FOREIGN PATENT DOCUMENTS

JP    59-206178 A  * 11/1984

(Continued)

OTHER PUBLICATIONS

English Translation of Japanese Office Action for Japanese Application No. 2003-511995, Apr. 10, 2008.

(Continued)

*Primary Examiner*—Kevin P Kerns
(74) *Attorney, Agent, or Firm*—Carlson, Gaskey & Olds

(57) ABSTRACT

A method of monitoring a resistance welding system is provided. The method utilizes a sensor for isolating and determining movement of a pin that typically supports an object to be welded such as a fastener. The movement of the pin is used to determine various present welding operation parameters to reduce cycle time, and increase efficiency and quality of the weld. The present welding operation parameters are compared to learned or stored welding operation parameters, for example, to determine whether a fault should be generated or whether an acceptable weld was achieved.

13 Claims, 8 Drawing Sheets

U.S. PATENT DOCUMENTS

| | | | |
|---|---|---|---|
| 4,441,006 A | 4/1984 | Machida et al. | |
| 4,447,700 A | 5/1984 | Cohen | |
| 4,596,917 A | 6/1986 | Nied et al. | |
| 4,861,960 A | 8/1989 | Haefner et al. | |
| 5,194,709 A | 3/1993 | Ichikawa et al. | |
| 5,393,950 A | 2/1995 | Killian | |
| 5,558,785 A | 9/1996 | Killian et al. | |
| 5,587,091 A | 12/1996 | Kawagoe et al. | |
| 5,632,912 A | 5/1997 | Cecil | 219/110 |
| 5,808,266 A | 9/1998 | Cecil | 219/110 |
| 6,020,569 A | 2/2000 | Cecil et al. | 219/109 |
| 6,043,449 A | 3/2000 | Kanjo | |
| 6,067,696 A | 5/2000 | Cecil et al. | 29/407.01 |
| 6,072,145 A | 6/2000 | Suita et al. | |
| 6,118,095 A | 9/2000 | Nagano | |
| 6,184,487 B1 | 2/2001 | Visscher | 219/91.1 |
| 6,232,572 B1 | 5/2001 | Kanjo | 219/110 |
| 6,274,840 B1 * | 8/2001 | Kanjo | 219/86.41 |
| 6,313,427 B1 | 11/2001 | Suita | |
| RE37,607 E | 3/2002 | Cecil | |
| 6,414,259 B2 | 7/2002 | Kanjo | |
| 6,576,859 B2 | 6/2003 | Cabanaw | |
| 6,906,279 B2 * | 6/2005 | Cabanaw | 219/119 |
| 7,282,664 B2 * | 10/2007 | Cabanaw | 219/119 |
| 2002/0066363 A1 | 6/2002 | Holt et al. | |
| 2002/0117051 A1 | 8/2002 | Yoh et al. | |
| 2003/0089684 A1 | 5/2003 | Beauregard et al. | |

FOREIGN PATENT DOCUMENTS

| | | | |
|---|---|---|---|
| JP | 359206178 | * | 11/1984 |
| JP | 5-237667 | | 9/1993 |
| JP | 6-238460 | | 8/1994 |
| JP | 7-100660 | * | 4/1995 |
| JP | 7-308786 | | 11/1995 |
| JP | 9-10956 | | 1/1997 |
| JP | 3051906 | | 6/1998 |
| JP | 3051906 U | * | 6/1998 |
| JP | 2837817 | | 10/1998 |

OTHER PUBLICATIONS

European Search Report for EP Application No, 05772221.7, Oct. 2, 2008.

Search Report PCT/CA02/00857; Filed Jun. 12, 2002.

* cited by examiner

| CONDITIONS | SIGNAL FEATURE | | | | | | | | |
|---|---|---|---|---|---|---|---|---|---|
| | BASELINE POSITION | CONTACT POINT | PEAK IMPACT DECELERATION | WELD START DISPLACEMENT | DEFORMATION DISPLACEMENT | WELD COLLAPSE ACCELERATION | WELD SETDOWN | TOTAL SETDOWN | RELEASE VELOCITY |
| PIN | BEFORE WELD | | | | | AFTER WELD INITIATION | | AFTER WELD COMPLETED | |
| RETURNED | | W | | | | | | | |
| CONTAMINATION | | W | | W | | | | | |
| STUCK TO WORKPIECE | | W | | W | | | | | |
| STICKING ON RETURN | | | | | | | | | T |
| ELECTRODE | | | | | | | | | |
| WEAR | | T | | | | | | | |
| FORCE | | | | W | W | | | | |
| MISALIGNMENT | | | | W | W | W | | | |
| WORKPIECE | | | | | | | | | |
| MISSING | | W | | W | | | | | |
| INCORRECT | | W | W | W | W | | | | |
| ORIENTATION (UP-SIDE DOWN) | | W | | W | W | | | | |
| DEFECTIVE | | | | | W | W | | | |
| WELD VARIABLES | | | | | | | | | |
| HEAT INPUT | | | | | | W | W | | |
| WELD SETDOWN | | | | | | | W | W | |

W = ACTUAL OR STATISTICAL WINDOWED VALUE     T = MEASURED OR STATISTICAL TREND

*Fig-14*

RESISTANCE WELDING FASTENER ELECTRODE AND MONITOR AND METHOD OF USING SAME

BACKGROUND OF THE INVENTION

This application claims the benefit of U.S. Provisional Application Ser. No. 60/538,054 filed Jan. 21, 2004 and is a Continuation-In-Part application that claims the benefit of U.S. Continuation application Ser. No. 10/360,237, filed on Feb. 6, 2003, now issued as U.S. Pat. No. 6,906,279 on Jun. 14, 2005, which claims the benefit of application Ser. No. 09/902,378 filed on Jul. 10, 2001, now issued as U.S. Pat. No. 6,576,859 on Jun. 10, 2003.

This invention relates to a weld gun for resistance welding metal components, such as fasteners, to a metallic object, such as sheet metal. More particularly, this invention relates to a method of using information obtained from a pin position sensor during the welding operation.

Weld gun assemblies are used to resistance weld fasteners to metallic objects such as body panels for vehicles. A fastener, such as a weld stud or nut, is loaded onto one of the electrodes. The electrodes are moved together with an actuator thereby placing the fastener into engagement with the panel under pressure. Very high currents are applied to the electrodes, which welds the fastener to the panel.

The use of weld guns is typically an automated process in which the fasteners are loaded into the weld gun assembly. Occasionally, the fastener is not properly loaded into the weld gun or the fastener may not be loaded into the weld gun at all. Under these circumstances, it is important to detect that there is a problem with the fastener so that the fastener can be properly welded to the panel. To this end, sensors have been used in an effort to determine the presence and orientation of the fastener in the weld gun. Typically, a linear variable displacement transducer has been connected to an electrode arm to measure the movement of the arm. If no nut is present the arm will move a greater amount than if a fastener is present and in the proper orientation. If the fastener is not in the proper orientation, then the electrode arm will move slightly less than if the fastener is in the proper orientation. In this manner, fastener presence and orientation has been detected.

It has been difficult to accurately detect the proper orientation of the fastener for several reasons. First, the position of the electrode arm does not always correspond to whether the fastener is in the proper orientation. That is, the location of the position sensor cannot detect fastener orientation accurately because of deflection in the weld gun, tolerance stack-ups and variations in the fastener. Second, the high electrode currents introduce inaccuracies into the position sensor signal. Even with magnetically shielded cables, enough interference from the electrode current is introduced to give false fastener readings. Applicant's U.S. Pat. No. 6,576,859 presents one solution to the problems of the prior art by measuring the pin position.

Prior art weld gun assembly configurations typically make comparative measurements that do not take into account work piece height variations or electrode wear. For example, metal thickness, waviness, projection height variation, or work piece deformation caused by prior cycling of the welder without current are all information ignored by prior art systems. Prior art systems needlessly extend the cycle time to account for variability in the above parameters. In applications where fasteners having small projections are used, the variability in work piece height can result in tight process windows or an inability to make a quality determination.

Prior art systems have monitored fastener upset using pressure to provide adaptive feedback. Upset is the collapse of the fastener projections during the welding operation. Displacement measurements using pressure have not been accurate enough to provide the required accuracy and dynamic response for a feedback control useful in the industry.

What is needed is a weld gun assembly that is capable of monitoring work piece height variations, fastener upset, and other welding operation parameters to reduce cycle times and provide improved feedback and control over the welding operation.

SUMMARY OF THE INVENTION

The present invention provides a method of monitoring a resistance welding system. The method utilizes a sensor for isolating and determining movement of a pin that typically supports an object to be welded such as a fastener. The movement of the pin is used to determine various present welding operation parameters to reduce cycle time, and increase efficiency and quality of the weld. The present welding operation parameters are compared to learned or stored welding operation parameters, for example, to determine whether a fault should be generated or whether an acceptable weld was achieved.

The pin position and displacement is determined by the sensor and used to gather the welding operation parameter for the weld cycle. The derivative of the pin displacement is also taken to determine pin velocity and pin acceleration during the welding operation. The load on the fastener and work piece can be determined with the pin displacement.

Accordingly, the present invention provides a weld gun assembly that is capable of monitoring work piece height variations, fastener upset, and other welding operations parameters.

BRIEF DESCRIPTION OF THE DRAWINGS

Other advantages of the present invention can be understood by reference to the following detailed description when considered in connection with the accompanying drawings wherein:

FIG. 14 is a table depicting the inventive monitoring functions during various phases of the welding operation.

DETAILED DESCRIPTION OF THE PREFERRED EMBODIMENT

Figure 1A:
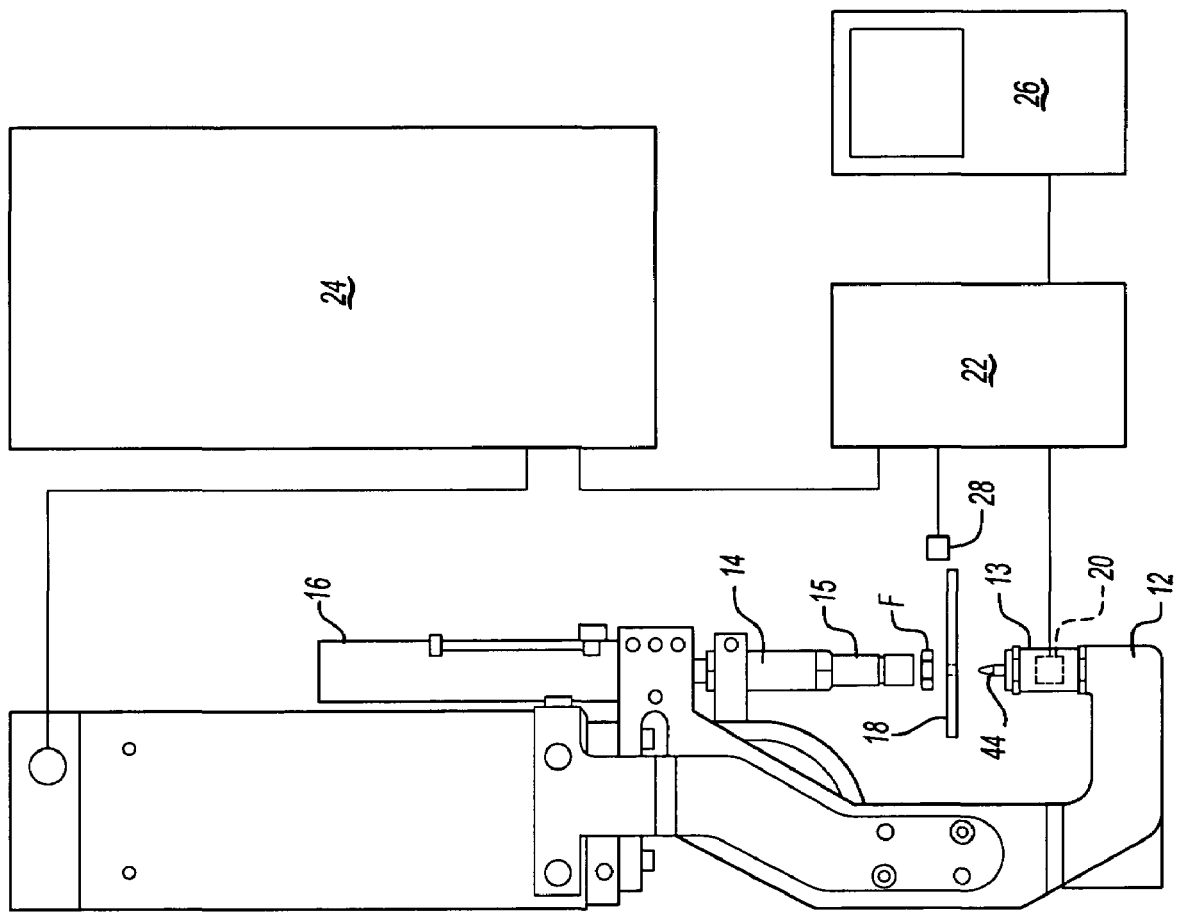
FIG. 1A is a schematic view of an inventive weld gun assembly.

FIG. 1A is a highly schematic view of a weld gun assembly 10. The weld gun assembly 10 includes a lower stationary arm 12 supporting a lower electrode 13. An upper movable arm 14 is connected to the lower arm 12. The upper arm 14 includes an upper electrode 15. An actuator 16 moves the upper arm 14 from an open position (shown) to a closed position in which the electrodes 13 and 15 are in engagement with an object 18 to be welded, such as a vehicle body panel. A fastener such as a weld stud or nut F is loaded onto one of the electrodes 13 and 15 and forced into engagement with the object 18.

The prior art has detected the presence and orientation of the fastener F within the weld gun assembly 10 by detecting the position of the upper arm 14, typically by utilizing a displacement transducer such as an LVDT attached to one of the arms 12 and 14. The present invention utilizes a position sensor 20 in the lower electrode 13 to detect the position and orientation of the fastener from underneath the object 18 by detecting pin position. By determining the pin position, which is more accurate than prior art measuring techniques, better control of the weld operation can be achieved.

While the arms and electrodes are referred to in terms of "upper" and "lower", it is to be understood that the weld gun assembly 10 and its components may be oriented in a manner other than described and remain within the scope of the invention. The invention is applicable to welding any metal objects together and should not be interpreted as being limited to welding fasteners to metal sheets.

A projection weld monitor 22 is connected to the position sensor 20 to determine the position of the pin 44 throughout the welding operation. The data relating to the pin position may be manipulated to determine other useful information relating to the welding operation, as will be appreciated from the description below. The projection weld monitor 22 is connected to a resistance welding control 24, which is also connected to the weld gun assembly 10. The resistance welding control 24 commands the actuator 16 and the flow of current through the electrodes 13 and 15 in response to information from the projection weld monitor 22. A proximity sensor 28 is connected to either the projection weld monitor 22 (shown) or the resistance welding control 24 to detect a condition in which multiple nuts F are loaded onto the pin, which triggers a fault. A monitor programming interface 26 is connected to the projection weld monitor 22 for receiving an analog signal from the projection weld monitor 22 and providing data to a remote location, if desired. Operation of the weld gun assembly 10 is monitored and analyzed using monitor programming interface 26, which may include statistical analysis software.

It should be understood that functions and structure of the projection weld monitor 22, resistance welding control 24 and monitor programming interface 26 can be integrated or arranged into any suitable configuration.

Figure 1B:
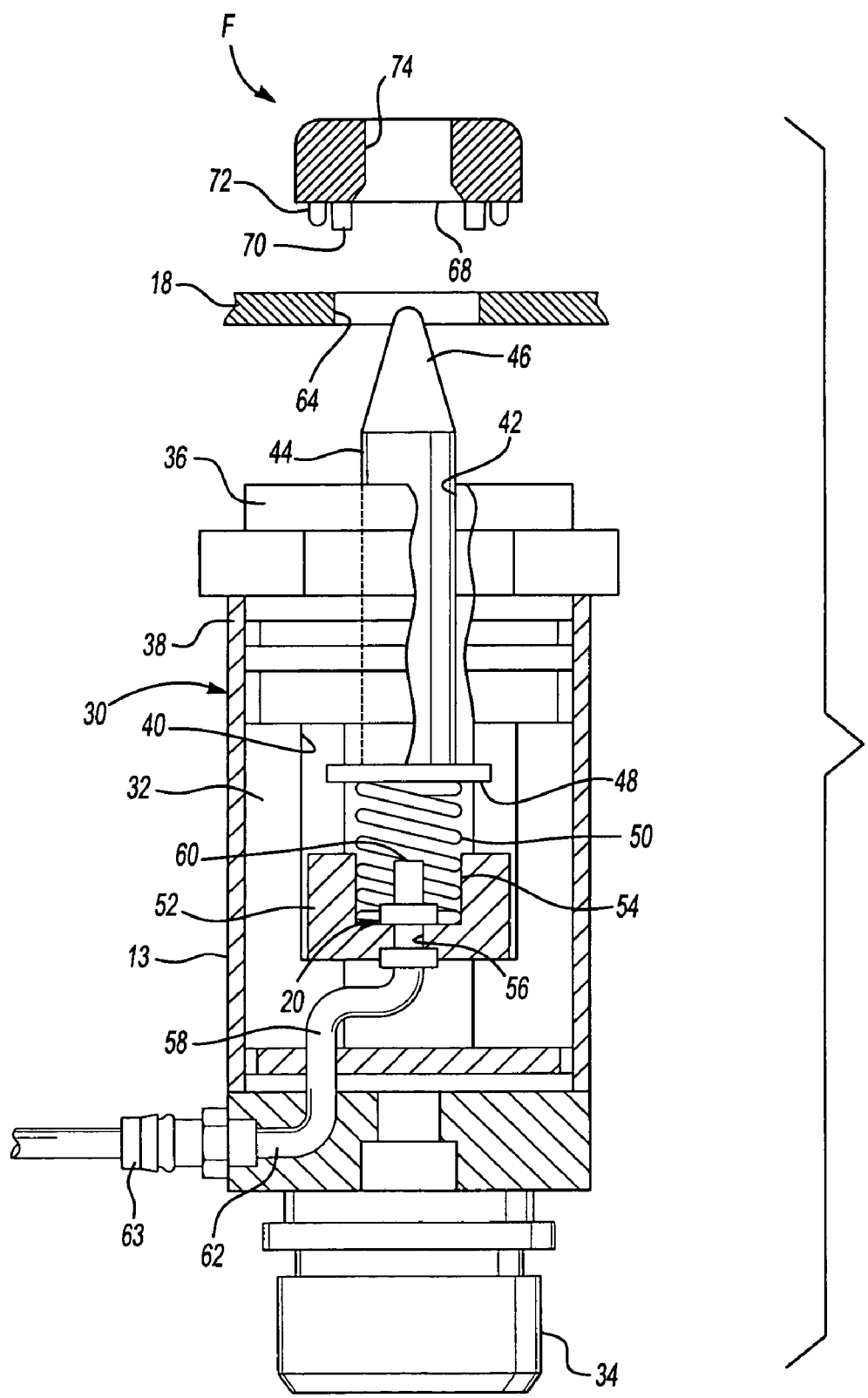
FIG. 1B is a partial cross-sectional exploded view of an electrode and sensor of the present invention.

The lower electrode 13 is shown in greater detail in FIG. 1B. The electrode 13 includes a housing assembly 30 having a body 32. The body 32 has an end 34 adapted to be received in the lower arm 12. A weld head 36 is attached to the body 32 opposite the end 34 for applying current to the object 18 and fastener F. The housing assembly 30 may further include a shell 38 surrounding the body 32. The body 32 includes a bore 40, and the weld head 36 includes an aperture 42 for receiving a pin 44. The body of the pin 44 is housed within the bore 40 and a first end 46 of the pin 44 extends through the aperture 42. The first end 46 is tapered in a manner to receive the fastener F such as a nut. However, it is to be understood that the geometry of the pin 44 may be modified to receive a weld stud or any other object.

The pin 44 includes a second end 48 opposite the first end 46 and has a flange for preventing the pin 44 from exiting the body 32. A return spring 50 biases the pin 44 toward the upper electrode 15. Pressurized air through the bore 40 may also be used to bias the pin 44.

A sensor mount 52 is arranged within the bore 40 and is fastened to the body 32. The sensor mount 52 includes a bore 54 for receiving and locating the spring 50. A sensor or fiber optic cable 58, preferably 3 millimeters in diameter, is fed into the housing assembly 30 and is received within a hole 56 of the sensor mount 52. A terminal end 60 of the fiber optic cable 58 is arranged proximate to the second end 48 of the pin 44. The fiber optic cable 58 may be fed into the body through an air passage 62 modified to receive an air fitting 63. In this manner, the electrode 13 is modified only slightly to receive the sensor 20 of the present invention. However, it is to be understood that the terminal end 60 may be arranged to be proximate to another portion of the pin 44. Alternatively, the terminal end 60 may be arranged proximate to another weld gun component that is associated with the movement of the pin 44. That is, the terminal end 60 does not necessarily have to be proximate to the pin, but the terminal end 60 isolates and tracks the movement of the pin 44.

In operation, the electrodes 13 and 15 are spaced apart from one another in an open position to receive an object 18 to which a fastener F is to be welded. The pin 44 is arranged in an aperture 64 of the object 18. A fastener F such as a nut is placed onto the first end 46 of the pin 44. The fastener F includes a weld face 68 that is in engagement with the object 18. The weld face 68 may include a pilot ring 70 locating the nut F within the aperture 64. The weld face 68 further includes projections 72 that become molten during the welding operation to weld the nut F to the object 18 thereby reducing the length of the projections 72. This process is commonly referred to as "upset." A hole 74 in the nut F may include features that cooperate with the first end 46 to better locate the nut 66 relative to the object 18. The features on the weld face 68, such as the pilot ring 70 and projections 72, are held to very tight tolerances.

Position measurements are typically taken with the electrodes 13 and 15 closed about the object 18, although position measurement are preferably taken throughout the welding operation (see, for example, FIG. 14). The force applied to the object 18 during measurement may be less than the weld force and may be taken before and after the weld to validate the process. By measuring the position of the pin 44, which is in engagement with the weld face side of the nut F, the pin position will more accurately relate to the nut orientation. Said another way, features of the nut F such as the thickness of the nut are not tightly toleranced or controlled. As a result, sensing the orientation of the nut F from the upper electrode side, such as by sensing the position of the upper arm 14 as in the prior art, may not accurately correspond to nut orientation due to the larger tolerance.

The fiber optic cable 58 carries light that is directed from the terminal end 60 onto the second end 48. Light is reflected from the second end 48 back into the fiber optic cable 58. In the case of an optical sensor, the projection weld monitor 22 may include an optical amplifier. The reflected light is received by the optical amplifier and generates an analog and/or digital signal. The signal is sent to a controller, which may be located in the projection weld monitor 22, to process the signal and determine, for example, the presence and orientation of the nut F. The sensor 20 is capable of detecting changes in pin distance to as low as 2 microns. A laser may use time of flight to measure the distance.

The electrodes 13 and 15 are moved together about the object 18 and nut F to a closed position. Pressure is applied to the nut F and the object 18 and a current is applied across the electrodes. Protrusions 72 melt in the presence of the high current and weld the nut F to the object 18.

The inventive weld gun assembly and monitoring equipment is useful, for example, in the detecting the orientation and presence of nut F, as described above. Detecting nut presence and orientation is discussed more fully in Applicant's U.S. Pat. No. 6,576,859, which is incorporated by reference. Due to its very high accuracy, the inventive system is also useful for determining whether the correct nut is installed on the pin 44, the quality of the weld, electrode wear, and pin operation, for example. Information relaying to pin displacement is gathered and manipulated to provide detailed information about the welding operation so that the cycle time can be reduced and more accurate faults provided during the welding operation. The weld gun assembly 10 goes through a teach mode (FIG. 13) to learn what an acceptable welding operation is as compared to a welding operation that should trigger a fault. Throughout the welding operation, the pin displacement and information derived from the pin displacement is compared to the learned or stored parameters for an acceptable welding operation to evaluate the welding operation.

Presently, available lower electrodes 13 may be modified or replaced to accommodate the sensor 20 of the present invention. The sensor 20 has the advantages of being contained within the electrode 13 where it is protected from the harsh welding environment. The sensor 20 is somewhat tolerant to contamination. Although the present invention sensor 20 is discussed in terms of an optical sensor, it is to be understood that more conventional sensors, such as LVDTs may be used to detect pin position, however, optical sensors have the advantages discussed above. Measurement speed and accuracy of the sensor 20 is desirable due to the fast cycle times and small pin displacements. Linear output from the sensor 20 is also desirable to simplify analysis of the pin movement.

Figure 2:
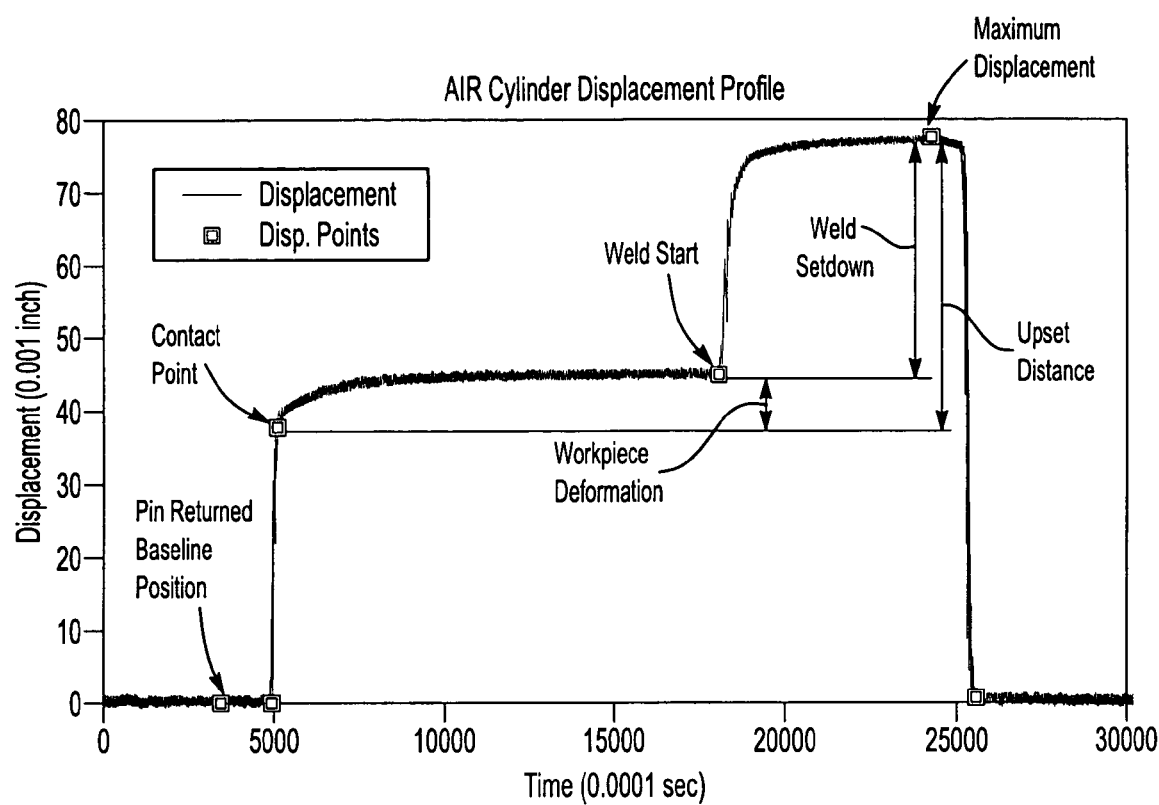
FIG. 2 is a graph of pin displacement profile versus time for an air cylinder.
Figure 3:
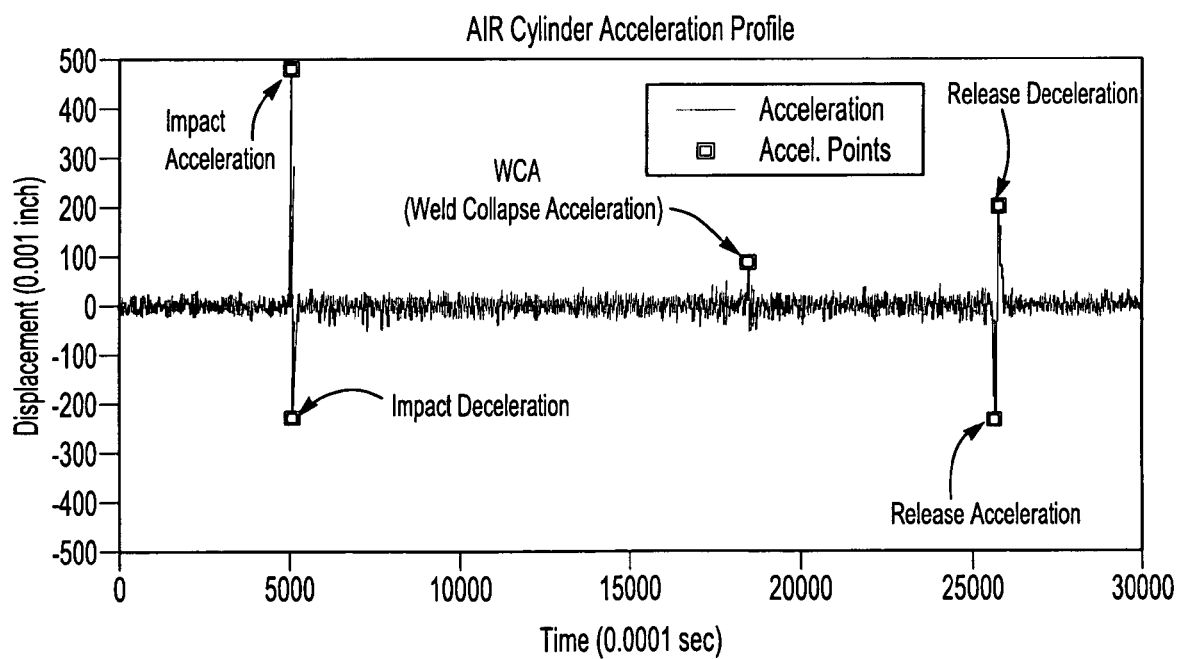
FIG. 3 is a graph of acceleration versus time for the pin displacement shown in FIG. 2.
Figure 4:
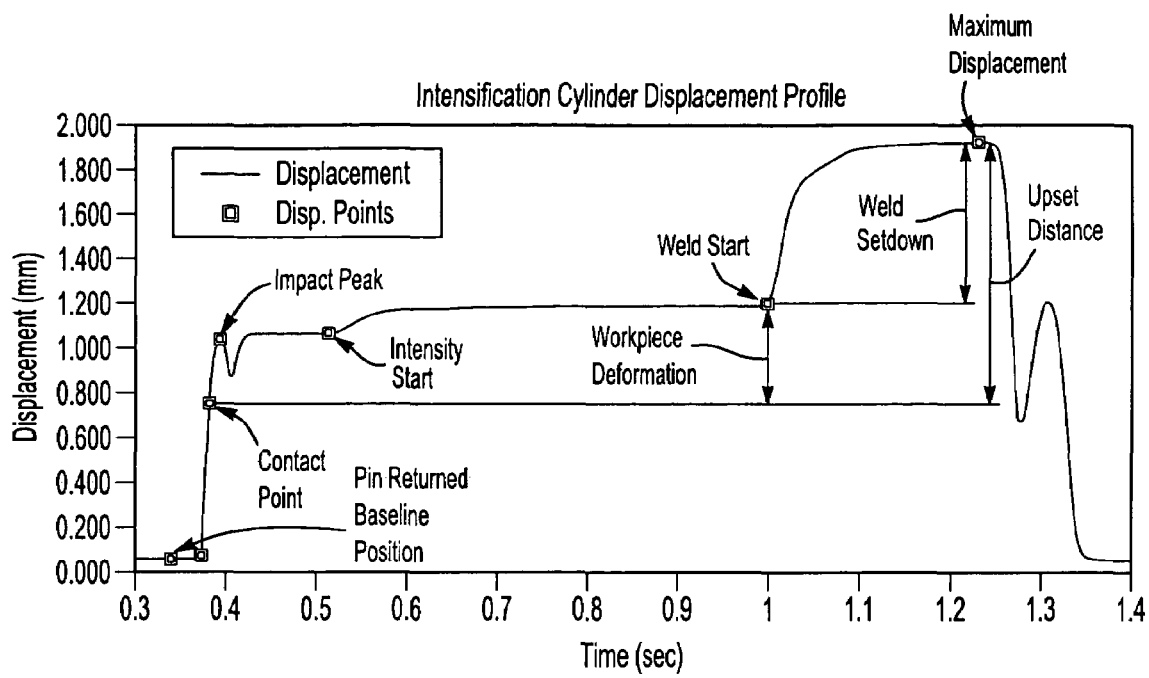
FIG. 4 is a graph of pin displacement versus time for an intensification weld cylinder.
Figure 5:
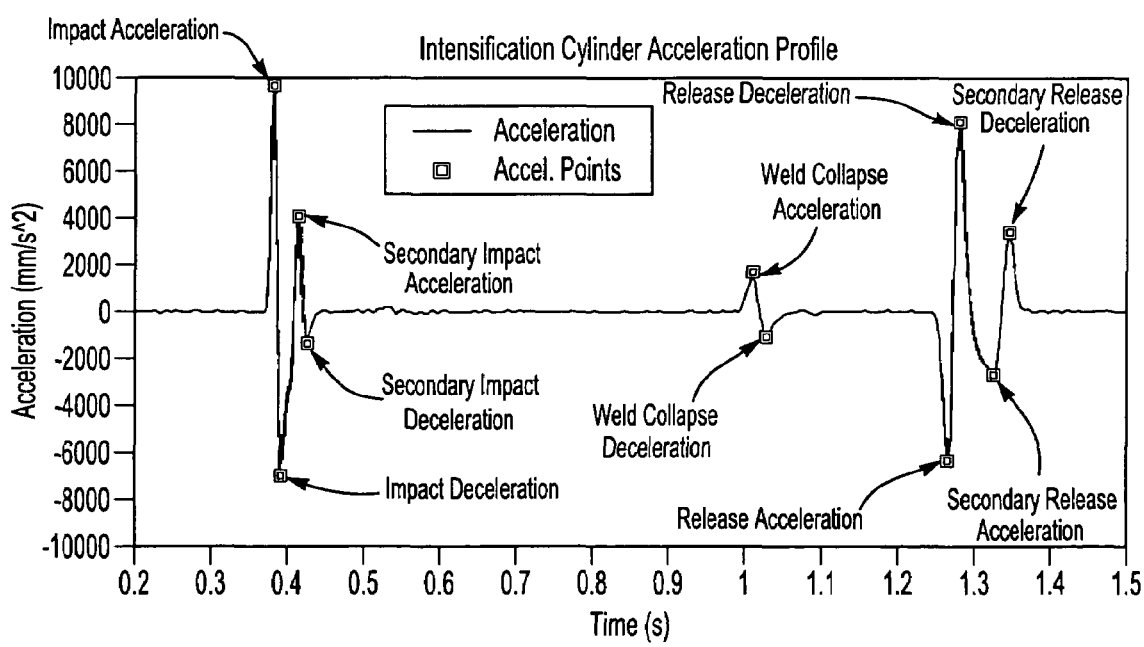
FIG. 5 is a graph of pin acceleration versus time for the pin displacement shown in FIG. 4.

FIG. 2 depicts displacement of the pin 44 versus time for a typical air cylinder. FIG. 3 depicts the acceleration versus time for the pin displacement shown in FIG. 2. FIGS. 4 and 5 are similar to that of FIGS. 2 and 3, except the pin displacement corresponds to an arrangement using an intensification cylinder, which has a unique signature as compared to the air cylinder shown in FIG. 2.

The pin 44 at its return position is used as a baseline. Once the resistance welding sequence is initiated, the pneumatic cylinder 16 moves the projection weld nut F towards the work piece 18. The point of initial contact between the nut F and the work piece 18 is determined by measuring a sudden change in velocity, which appears subsequent to the contact point in FIG. 2. In FIG. 3, the pin 44 is shown accelerating toward the work piece 18, and the pin 44 begins to decelerate after the contact point. The velocity of the pin 44 decreases indicative of the weld nut projections 72 making the transition from traveling through free air into intimate contact with the work piece 18. The pneumatic cylinder 16 continues to apply force to the projection weld nut F resulting in the measurable amount of elastic and plastic deformation prior to the initiation of the welding current. The pin displacement attributable to the weld nut F and work piece 18 deformation is indicative of the load on these objects. Welding may commence after the desired load is achieved, which reduces the cycle time.

The compressive load applied to the projections during this phase of the welding operation should yield a predictable amount of plastic and elastic deformation for a particular nut F and work piece 18 combination. In this manner, particular combination have a unique, identifiable signature. This initial displacement allows the projection weld monitor 22 to determine that the correct fastener has been loaded and to verify that the proper electrode force has been applied. Fasteners with the wrong number or sizes of projections, uneven projection heights, or fasteners with excessive pre-existing plastic deformation can be identified prior to welding.

Once this verification process has been completed, welding current may be applied. Typically in prior art systems, the nut F and work piece 18 were kept under load for an unnecessarily long time to ensure that the desired work piece deformation had been achieved. With the inventive system, the current can be started earlier in the welding operation.

Once the desired work piece deformation is achieved, the welding current is applied. The welding current causes considerable displacement as the projections soften and melt under the high current from the electrodes 13 and 15 the load of the pneumatic cylinder 16. The softening and melting is known as weld set down, and the upset distance is the distance from the maximum displacement to the initial contact point of the nut F with the work piece 18.

The rate of soften and melting is shown as a "weld collapse acceleration" in FIG. 3. The weld collapse acceleration is a function of the characteristics of the work piece 18 and the size and shape of projections of the nut F. The amplitude of the upset distance is characteristic of the amount of heating, which will be discussed below relative to FIG. 12, and the weld gun follow up.

At the end of the welding operation, the electrodes 13 and 15 are retracted by the pneumatic cylinder 16 allowing recovery of the return spring 50. The pin 44 displacement and motion profile is characteristic of the weld gun assembly 10 and work piece 18. The release acceleration of the pin 44 and its subsequent deceleration as the pin 44 returns to its baseline position is shown in FIG. 3.

FIGS. 3 and 4 relate to pin displacement associated with an air/oil intensification cylinder. An air/oil intensification cylinder has a characteristic increase in displacement when the cylinder 16 changes from closed force to intensified force. Another characteristic change in the displacement of the pin 44 is during the electrode retraction phase. The air/oil intensification cylinder has a characteristic acceleration profile for the intensification cylinder. There is a low driving force at initial impact resulting in a secondary acceleration from electrode bounce. The amplitude of this signal correlates with the elastic deformation caused by the projection weld nut F impacting the work piece 18.

Measuring the pin displacement and isolating it from the displacement of other portions of the weld gun assembly 10 enable accurate information to be gathered relating to each welding operation. Because there is a positive measurement of the pin motion as the nut F and work piece 18 are forced together, both the impact deceleration and the weld collapse acceleration are insensitive to the additional displacement. Since acceleration measurements are being taken, displacement overtravel resulting from the force impacting the pin 44 or binding in the work piece 18 is not significant. Prior art systems, all of which do not isolate pin displacement, are incapable of taking accurate measurements useful for monitoring and analyzing the welding operation in the manners described above.

Figure 6A:
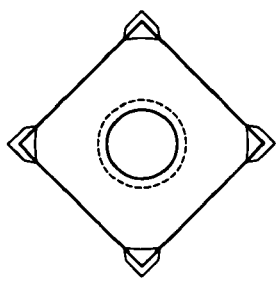
FIGS. 6A-10B are bottom and partial side cross-sectional views of various projection weld nuts.
Figure 6B:
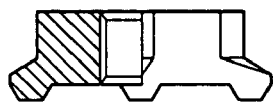
Figure 7A:
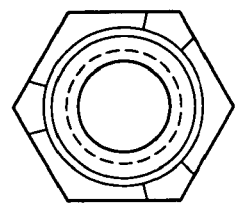
Figure 7B:
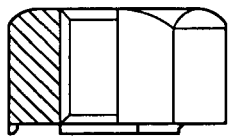
Figure 8A:
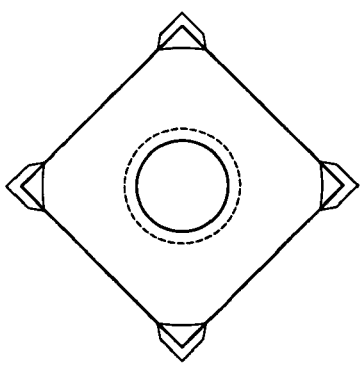
Figure 8B:
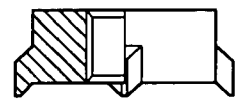
Figure 9A:
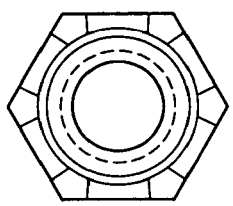
Figure 9B:
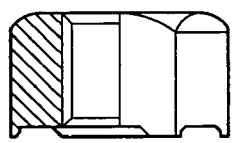
Figure 10A:
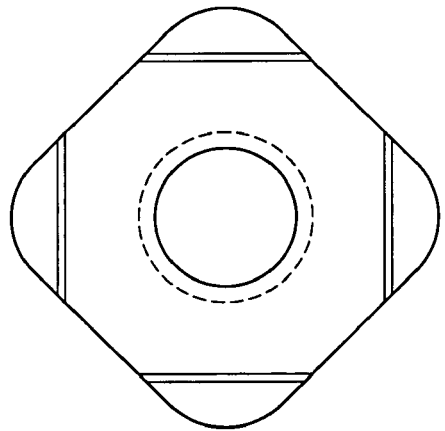
Figure 10B:
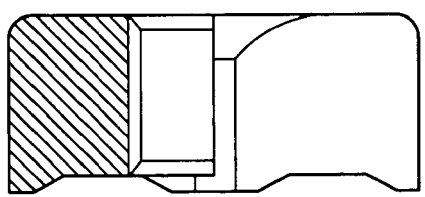
Figure 11:
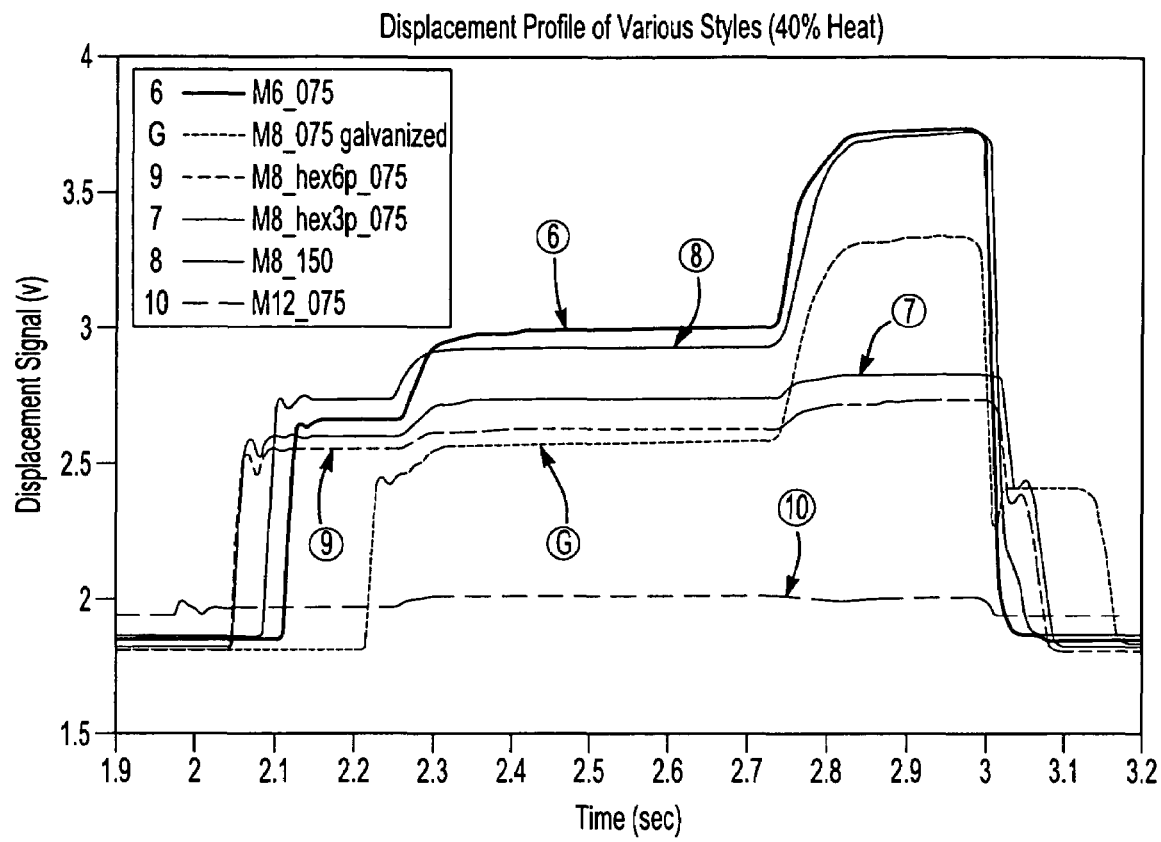
FIG. 11 is a graph of pin displacement versus time for the weld nuts shown in FIGS. 6A-10B.

FIGS. 6A-10B illustrate various weld nuts. Each weld nut provides characteristic motion profiles that can be identified with the inventive system. The displacement profiles of the weld nuts shown in FIGS. 6A-10B at a particular heat are shown in FIG. 11. FIGS. 6A and 6B correspond to the curve labeled as 6, FIGS. 7A and 7B correspond to curve labeled as 7, and so on. The curves 6-10 correspond to the various weld nuts shown in FIGS. 6A-10B welded to a steel work piece 18. The curve labeled G is the weld nut shown in FIG. 9A-9B welded to galvanized steel. FIG. 11 illustrates that the inventive system is capable of identifying not only different projection weld nuts F but also work pieces 18 of different materials. Again, different combinations result in a unique identifiable signature. However, prior art systems are not accurate enough to either recognize or measure these signatures.

Figure 12:
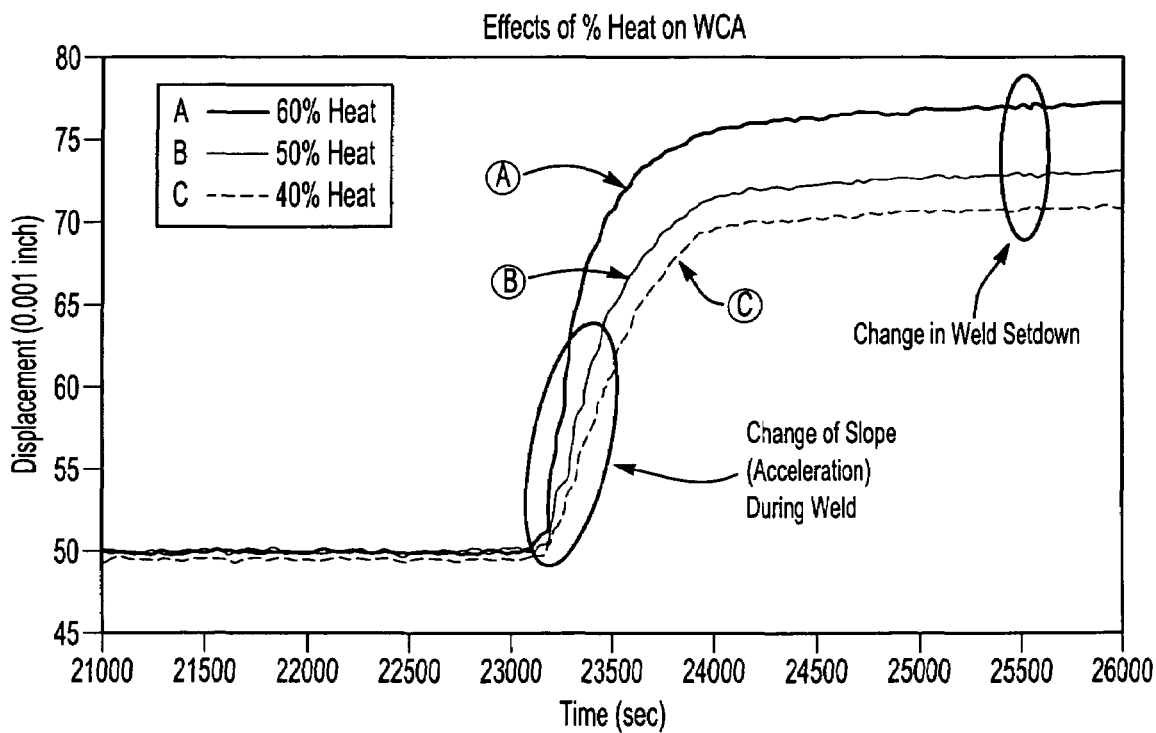
FIG. 12 is a graph of pin displacement versus time for different percent heating rates.

The inventive system can also differentiate the different heating rates be applied during the welding operation, as shown in FIG. 12. Different heating rates affect the weld collapse acceleration and the upset distance. As the heating rate increases, the displacement rate and total displacement of the pin 44 increases. In some applications, work pieces 18 are sufficiently strong to avoid initial upset. The inventive system is capable of capturing work piece expansion due to temperature increases. The rate of displacement also correlates to the mass and shape of projections of the weld nut F.

Figure 13:
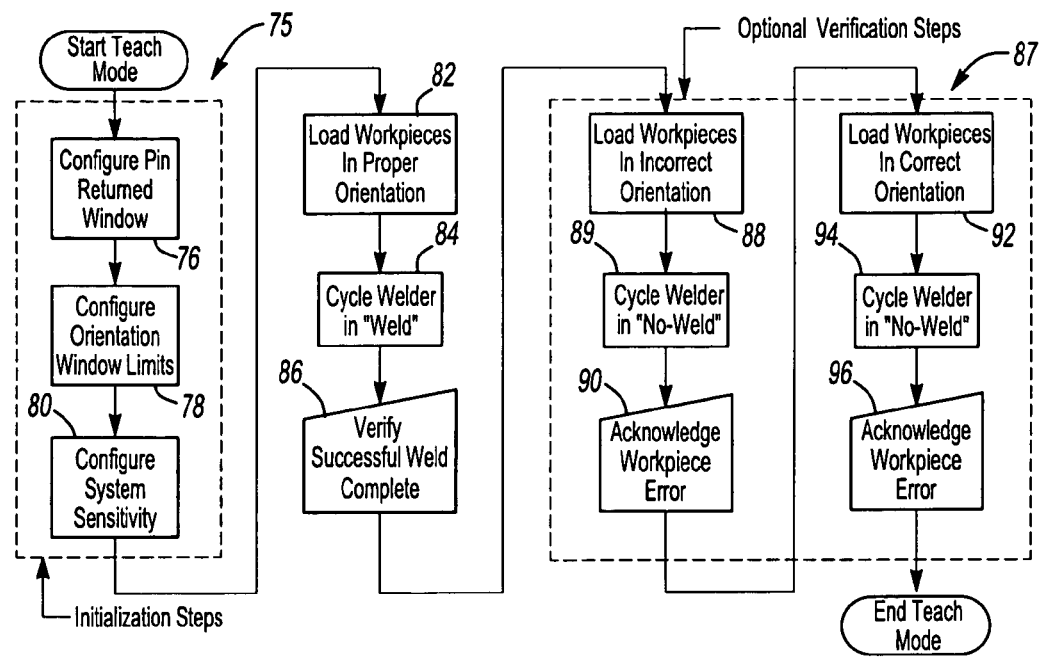
FIG. 13 is a flow chart depicting a method of teaching the projection weld monitor to recognize various aspects of the welding operation.

FIG. 13 depicts a teaching mode in which the projection weld monitor 22 learns to recognize various weld nuts F and work pieces 18 to evaluate whether a desirable welding operation has been achieved. The teaching mode begins by performing initialization steps, indicated at block 75, which provides some basic reference points for analysis. The return window of the pin is configured, as indicated at block 76, by reading the baseline position of the pin 44 and an acceptable depressed position of the pin 44 to establish acceptable upper and low pin position limits.

The weld nut F orientation window limits are configured, as indicated at block 78. The orientation limits are learned by loading the nut F in various acceptable and unacceptable orientations for various fasteners, for example, as described in Applicant's U.S. Pat. No. 6,576,859. The overall system sensitivity is configured, as indicated at block 80 to account for variations such as work piece height, metal thickness, projection height variation, work piece deformation during the welding operation, or electrode wear.

Next, actual work pieces 18 and projection weld nuts F are loaded in a proper orientation, as indicated at block 82. The weld gun assembly 10 is cycled to complete a welding operation, as indicated at block 84. The operator verifies that a successful weld has been completed, as indicated at block 86. If the welding operation is successful, the welding operation parameters, for example, as described relative to FIGS. 2-5 and 11-12, are stored for comparison against subsequent welding operations.

Optional verification steps may be performed as indicated at block 87. In addition to loading projection weld nut fasteners F and work pieces 18 in a proper orientation, the nuts F and work pieces 18 may be loaded in various incorrect orientations so that a particular fault may be identified, as indicated at block 88. The weld gun assembly 10 is cycled, as indicated at block 89, and the workpiece error is acknowledged, as indicated in block 90. The welding operation parameters for that welding operation are associated with a particular fault that can be used in comparison with subsequent welding operations. The projection weld fasteners F and work pieces 18 are then loaded in a correct orientation, as indicated at block 92. The weld gun assembly 10 is cycled using one or more unacceptable parameters, as indicated at block 94, which are acknowledged at block 96. A fault is associated with that welding operation for a nut F and work piece 18 combination that is in a correct orientation, but is undesirable with respect to some other parameter. In this manner, each welding operation may be compared with acceptable and unacceptable welding operation parameters to determine a fault and, if desired, determine the specific fault. The stored welding operation parameters are, for example, pin displacement and the associated pin acceleration, as illustrated in FIGS. 2-5 and 11-12.

Detailed information regarding each welding operation may be gathered throughout various phases of the welding operation, as shown in FIG. 14. The parameters indicate in FIG. 14 are exemplary only, and are in no way intended to be limiting. Many welding operation parameters can be accurately monitored by utilizing the pin displacement measurements from the sensor 20. Since the pin displacement is isolated from the movement of other portions of the weld gun assembly 10, reliable, accurate information may be obtained and analyzed.

Since the pin displacement information gathered is accurate, a statistical analysis can be made to evaluate welding operation parameters such as electrode wear and sticking pin return. The contact point can be measured over time and a statistical analysis regarding the contact point can be made to track the wear of the electrode to determine when the electrode should be replaced. Furthermore, the assembly compensates for electrode wear by adjusting the welding operation as necessary. Similarly, the pin's baseline position can be tracked over time to determine whether the pin 44 is sticking on return from, for example, contamination or damage. A sticking pin 44 can be identified by a statistically significant change in the release velocity, for example. Moreover, future maintenance to the weld gun assembly 10 can be predicted.

Figure 15:
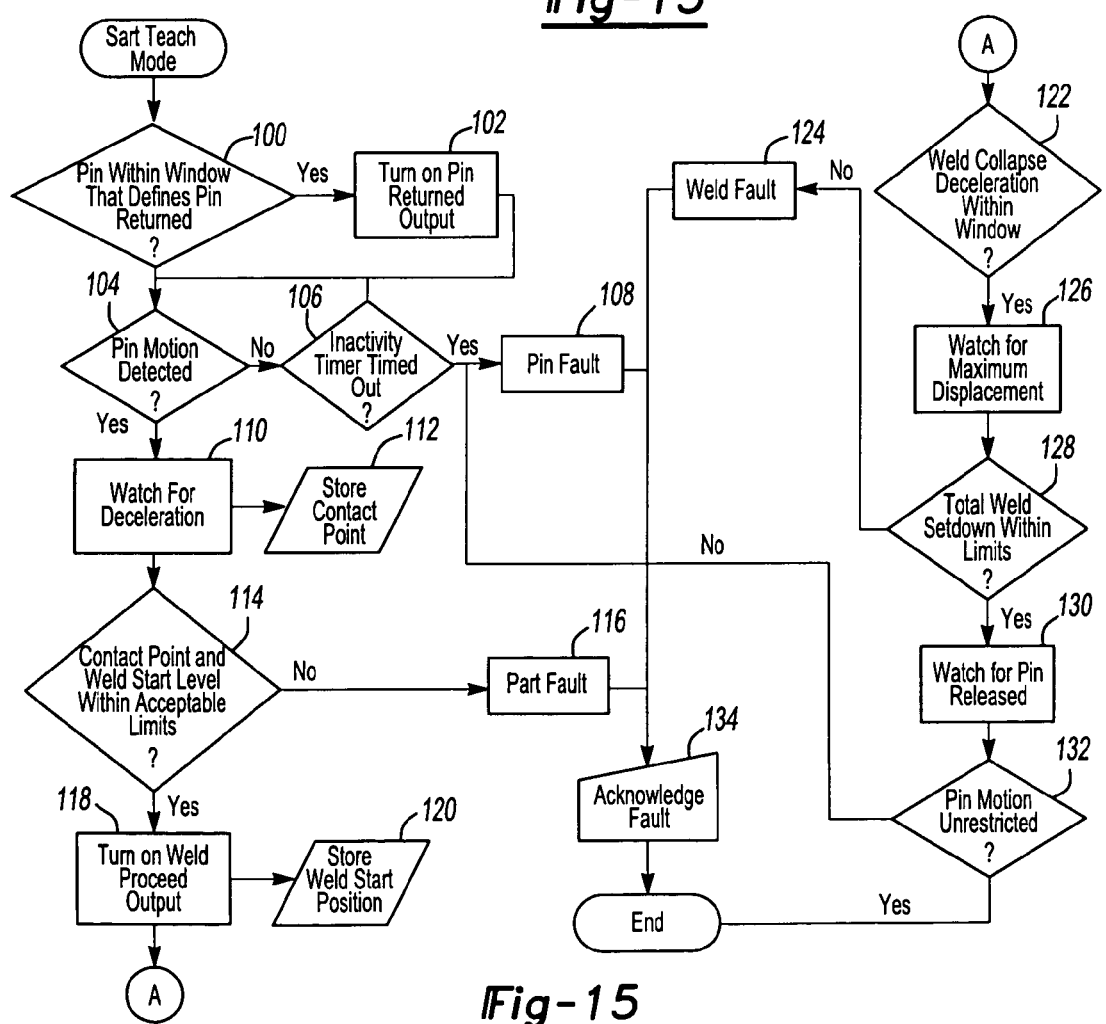
FIG. 15 is a flow chart depicting the inventive monitoring process during the welding operation.

A flow chart of the method used by the projection weld monitor for the inventive system is shown in FIG. 15. The position of the pin 44 is monitored by the sensor 20 to determine whether the pin 44 is within the desired window for the baseline pin position, as indicated at block 100 and learned at block 76 (FIG. 13) during the initialization steps. If the pin 44 is in a desired position, an indication is made to the resistance welding control 24, as indicated at block 102. A pin motion is detected at block 104. If the pin 44 should have moved, but did not, within a specified time, as indicated at block 106, then a pin fault will be generated, as indicated at block 108.

The pin 44 is monitored by the sensor 20 for pin deceleration, as indicated at block 110 which indicates that contact has occurred between the projection weld nut F and the work piece 18. The contact point is stored, as indicated at block 112.

If the contact point and load on the nut F and the work piece 18 by the actuator 16 are within acceptable limits, as indicated at block 114, then the resistance welding control 24 commands the weld gun assembly 10 to apply current to the electrodes 13 and 15. In the present invention, current can be applied as soon as the desired pin parameters are detected by the sensor 20, as opposed to waiting a predetermined time as with the prior art. Specifically, the deformation of the nut F and work piece is measured to determine whether the desired load on these objects has been achieved. If these parameters are out of limits, as determined by a comparison from information stored at blocks 82, 84, 86 (FIG. 13), for example then a part fault is indicated at block 116.

Once the current has been applied to the electrodes 13 and 15 (block 118), the weld start position is stored at block 120. The weld collapse deceleration is measured, as indicated at block 122 and learned at block 84 and 86 (FIG. 13). If the weld collapse deceleration is not within limits, then a weld fault is indicated at block 124. A poor welding condition, such as weld expulsion in which molten material is expelled from the weld area, can be detected by observing on excessive rate of collapse.

The maximum displacement during weld set down is determined at block 126. If the weld set down is not within limits, as determined at block 128, then a weld fault is indicated at block 124. If the weld set down is within limits, then the resistance welding control 24 commands the weld gun assembly 10 to open the electrodes 13 and 15 with the actuator 16. The upset distance is a good indication of weld quality, and is observe also using pin displacement.

The pin release is monitored at 130 to ensure that the pin motion is unresistricted, as indicated at block 132. If the pin motion at block 132 appears to be restricted, then a pin fault is set at block 108.

Any of the faults 108, 116 and 124 may require acknowledgement of the fault, as indicated at block 134 until which point, for example, the weld gun assembly 10 will not cycle and the arms 12 and 14 will not open until manually overridden by the operator.

In this manner, the inventive assembly and method isolate pin displacement and use the pin displacement to gather welding operation parameters to reduce cycle time and increase efficiency and quality.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of monitoring a resistance welding system comprising the steps of:
   a) providing an electrode having a movable pin supporting an object to be welded;
   b) measuring a parameter of the pin;
   c) determining a welding operation parameter from the pin parameter including determining at least one of a weld collapse acceleration, a weld set down distance, and an upset distance;
   d) comparing a present welding operation parameter to a learned welding operation parameter; and
   e) setting a weld fault with the present welding operation parameter being undesired relative to the learned welding operation parameter.

2. The method according to claim 1, comprising the step of generating a pin fault with the present welding operation parameter being undesired relative to the learned welding operation parameter.

3. The method according to claim 2, wherein step c) includes determining a baseline pin position in which the displacement is zero.

4. The method according to claim 1, comprising generating a part fault with the present welding operations parameter being undesired relative to the learned welding operation parameter.

5. The method according to claim 1, wherein step c) includes determining pin position.

6. The method according to claim 1, wherein step c) includes determining pin displacement.

7. The method according to claim 1, comprising the step of determining a load on the object to be welded.

8. The method according to claim 7, comprising the step of determining a signature for a combination of a work piece and the object to be welded based upon the load.

9. The method according to claim 1, wherein step b) includes isolating movement of the pin from other component movements of the resistance welding system.

10. The method according to claim 1, wherein the object to be welded is a fastener.

11. The method according to claim 10, wherein the fastener is a nut.

12. The method according to claim 1, wherein the pin is supported by and movable relative to the electrode therewithin, the pin being depressed into the electrode in response to an opposing electrode moving toward the electrode.

13. The method according to claim 12, wherein the electrode is supporting by a stationary lower arm, and the opposing electrode is supported by a movable upper arm.

* * * * *

UNITED STATES PATENT AND TRADEMARK OFFICE
CERTIFICATE OF CORRECTION

| | | |
|---|---|---|
| PATENT NO. | : 7,564,005 B2 | Page 1 of 1 |
| APPLICATION NO. | : 11/001505 | |
| DATED | : July 21, 2009 | |
| INVENTOR(S) | : Cabanaw et al. | |

It is certified that error appears in the above-identified patent and that said Letters Patent is hereby corrected as shown below:

Title page item 63

The "Related U.S. Application Data" section on the patent's front page should read as follows.

Continuation-in-part of application No. 10/360,237,
filed on Feb. 6, 2003, now Pat. No. 6,906,279,
which is a Continuation of application No. 09/902,378,
filed on Jul. 10, 2001, now Pat. No. 6,576,859.

Provisional application No. 60/538,054 filed on
Jan. 21, 2004.

Signed and Sealed this

Seventeenth Day of November, 2009

David J. Kappos
*Director of the United States Patent and Trademark Office*